(12) United States Patent
Curley et al.

(10) Patent No.: US 7,143,194 B1
(45) Date of Patent: Nov. 28, 2006

(54) SYSTEM AND METHOD FOR OPTIMIZING THE DATA TRANSFER BETWEEN MIRRORED DATABASES STORED ON BOTH A CLIENT AND SERVER COMPUTER

(75) Inventors: Vincent H. Curley, Seattle, WA (US); J. Peter Hansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 09/615,183

(22) Filed: Jul. 13, 2000

(51) Int. Cl.
*G06F 15/16* (2006.01)

(52) U.S. Cl. ............... 709/248; 709/203; 709/213; 707/2; 707/201

(58) Field of Classification Search .......... 709/248, 709/213, 203, 217–219; 707/2, 10, 200–201; 718/101; 719/328
See application file for complete search history.

(56) References Cited

U.S. PATENT DOCUMENTS

| | | | | |
|---|---|---|---|---|
| 5,758,355 A | * | 5/1998 | Buchanan | 707/201 |
| 5,884,325 A | * | 3/1999 | Bauer et al. | 707/201 |
| 5,970,502 A | * | 10/1999 | Salkewicz et al. | 707/201 |
| 5,999,947 A | * | 12/1999 | Zollinger et al. | 707/203 |
| 6,108,664 A | * | 8/2000 | Nori et al. | 707/103 |
| 6,226,650 B1 | * | 5/2001 | Mahajan et al. | 707/201 |
| 6,341,316 B1 | * | 1/2002 | Kloba et al. | 709/248 |
| 6,442,570 B1 | * | 8/2002 | Wu | 707/201 |
| 6,457,065 B1 | * | 9/2002 | Rich et al. | 709/328 |
| 6,505,214 B1 | * | 1/2003 | Sherman et al. | 707/201 |
| 2002/0049579 A1 | * | 4/2002 | Gates et al. | 707/104.1 |

* cited by examiner

*Primary Examiner*—Philip B. Tran
(74) *Attorney, Agent, or Firm*—Christensen O'Connor Johnson Kindness PLLC

(57) ABSTRACT

A system and method for efficiently synchronizing multiple databases stored on multiple computing devices while maintaining parent-child relationships between related database objects. The method and system allows a client computer to update a server database while minimizing the number of network connections between the client and server computers. The method and system provides the generation of object ID numbers for database objects by the server computer, thus allowing multiple clients to store the same database. In one embodiment, the method and system synchronizes the databases of client and server computers by selectively uploading objects from the client computer database, thereby minimizing the amount of data transferred between the client and server computers. The synchronization routine selectively uploads primary objects based on the status code of the objects. The status code of each object is updated by an update routine that verifies if the related parent and grandparent objects have been successfully uploaded. If a parent object has been successfully uploaded, then its children, grandchildren and successors are also uploaded. If any particular object is not successfully uploaded from the client computer to the server computer, the related child and grandchildren objects are all bypassed and not uploaded to the server computer.

14 Claims, 11 Drawing Sheets

| OBJECT NAME | LOCAL ID | SERVER ID | PARENT ID | STATUS |
|---|---|---|---|---|
| ACCOUNT A1 | 1 | NONE | NONE | TO BE UPLOADED |
| ACCOUNT A2 | 10 | NONE | NONE | TO BE UPLOADED |
| UPLOAD NECESSARY | | | | |
| POSITION P1 | 2 | NONE | 1 | TO BE UPLOADED |
| POSITION P2 | 6 | NONE | 1 | TO BE UPLOADED |
| POSITION P3 | 11 | NONE | 10 | TO BE UPLOADED |
| UPLOAD NECESSARY | | | | |
| TRANSACTION T1 | 3 | NONE | 2 | TO BE UPLOADED |
| TRANSACTION T2 | 4 | NONE | 2 | TO BE UPLOADED |
| TRANSACTION T3 | 5 | NONE | 2 | TO BE UPLOADED |
| TRANSACTION T4 | 7 | NONE | 6 | TO BE UPLOADED |
| TRANSACTION T5 | 8 | NONE | 6 | TO BE UPLOADED |
| TRANSACTION T6 | 9 | NONE | 6 | TO BE UPLOADED |
| TRANSACTION T7 | 12 | NONE | 11 | TO BE UPLOADED |
| TRANSACTION T8 | 13 | NONE | 11 | TO BE UPLOADED |
| TRANSACTION T9 | 14 | NONE | 11 | TO BE UPLOADED |
| UPLOAD NECESSARY | | | | |

*Fig. 4B.*

| OBJECT NAME | LOCAL ID | SERVER ID | PARENT ID | STATUS |
|---|---|---|---|---|
| ACCOUNT A1 | 1 | 100 | NONE | UPLOADED |
| ACCOUNT A2 | 10 | NONE | NONE | ERROR |
| UPLOAD PERFORMED | | | | |
| POSITION P1 | 2 | NONE | SERVERID 100 | TO BE UPLOADED |
| POSITION P2 | 6 | NONE | SERVERID 100 | TO BE UPLOADED |
| POSITION P3 | 11 | NONE | 10 | ERROR |
| UPLOAD NECESSARY | | | | |
| TRANSACTION T1 | 3 | NONE | 2 | TO BE UPLOADED |
| TRANSACTION T2 | 4 | NONE | 2 | TO BE UPLOADED |
| TRANSACTION T3 | 5 | NONE | 2 | TO BE UPLOADED |
| TRANSACTION T4 | 7 | NONE | 6 | TO BE UPLOADED |
| TRANSACTION T5 | 8 | NONE | 6 | TO BE UPLOADED |
| TRANSACTION T6 | 9 | NONE | 6 | TO BE UPLOADED |
| UPLOAD NECESSARY | | | | |
| TRANSACTION T7 | 12 | NONE | 11 | ERROR |
| TRANSACTION T8 | 13 | NONE | 11 | ERROR |
| TRANSACTION T9 | 14 | NONE | 11 | ERROR |

*Fig. 4C.*

| OBJECT NAME | LOCAL ID | SERVER ID | PARENT ID | STATUS |
|---|---|---|---|---|
| ACCOUNT A1 | 1 | 100 | NONE | UPLOADED |
| ACCOUNT A2 | 10 | NONE | NONE | ERROR |
| UPLOAD PERFORMED | | | | |
| POSITION P1 | 2 | 150 | SERVERID 100 | UPLOADED |
| POSITION P2 | 6 | 152 | SERVERID 100 | UPLOADED |
| POSITION P3 | 11 | NONE | 10 | ERROR |
| UPLOAD NECESSARY | | | | |
| TRANSACTION T1 | 3 | NONE | SERVERID 150 | TO BE UPLOADED |
| TRANSACTION T2 | 4 | NONE | SERVERID 150 | TO BE UPLOADED |
| TRANSACTION T3 | 5 | NONE | SERVERID 150 | TO BE UPLOADED |
| TRANSACTION T4 | 7 | NONE | SERVERID 152 | TO BE UPLOADED |
| TRANSACTION T5 | 8 | NONE | SERVERID 152 | TO BE UPLOADED |
| TRANSACTION T6 | 9 | NONE | SERVERID 152 | TO BE UPLOADED |
| UPLOAD NECESSARY | | | | |
| TRANSACTION T7 | 12 | NONE | 11 | ERROR |
| TRANSACTION T8 | 13 | NONE | 11 | ERROR |
| TRANSACTION T9 | 14 | NONE | 11 | ERROR |

*Fig. 4D.*

SYSTEM AND METHOD FOR OPTIMIZING THE DATA TRANSFER BETWEEN MIRRORED DATABASES STORED ON BOTH A CLIENT AND SERVER COMPUTER

FIELD OF THE INVENTION

The present invention relates to computer communications and, in particular, to a method and system for efficiently synchronizing multiple databases.

BACKGROUND OF THE INVENTION

As known to those skilled in the art, the term "Internet" refers to the vast collection of computers and network devices that use various protocols to communicate with one another. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hypertext Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute electronic documents. A Web site may use one or more Web server computers that store and distribute documents in one of a number of formats including the Hypertext Markup Language (HTML). An HTML document contains text and metadata such as commands providing formatting information. HTML documents also include embedded "links" that reference other data or documents located on any Web server computers. The referenced documents may represent text, graphics, or video in respective formats.

A Web browser is a client application or operating system utility that communicates with server computers via FTP, HTTP, and Gopher protocols. Web browsers receive electronic documents from the network and present them to a user. Internet Explorer, available from Microsoft Corporation, Redmond, Wash., is an example of a popular Web browser application.

In a networked computing environment, such as the Internet described above, some computer systems are configured to maintain a number of databases having common data. For example, Web servers that transmit a substantial amount of data to client computers utilize database designs configured to store the same data on the client computers as well as on the server computer. This duplicated database configuration allows client computers to perform certain operations without having to establish a network connection with a particular server computer. A duplicated database configuration is also well suited for client computers that are connected to a network through a slow data connection or via temporary connections such as a remote telephone connection.

One illustrative example of a computer system that is configured to maintain a number of databases having common data can be found at a financial Web site, such as one provided by Microsoft Corporation at the Web address, MONEYCENTRAL.MSN.COM. The Web server for the MoneyCentral Web site utilizes a duplicated database similar to the one described above. This configuration allows a client computer to perform certain operations using the information stored on the client computer database without having to establish a network connection to the Web server. The duplicated database located at the MoneyCentral Web site requires communication between the client and server computers to synchronize the databases.

Various Web sites having large duplicated databases, such as the one at MoneyCentral, require the client and server computers exchange a substantial amount of data. For instance, each time a client computer modifies one object in the client computer database, the client computer establishes a connection to the server computer and transmits the new data to the server database. In some situations where the client computer frequently updates the server database with small sized data packets, the two computing devices may be slowed because it is inefficient to transmit many small data packets using a large number of connections. In addition, as more data traffic is moved over the Internet, there is a continuing need to improve the efficiency of data transfer between two computers having duplicated databases.

Accordingly, there is a need for a method and system for efficiently managing and synchronizing a plurality of databases having identical information, that are stored on more than one computer. In addition, there is a need to provide a data hierarchy that facilitates efficient data transfer between a client computer and a server computer having an identical database. As databases become larger and more complex, there is an increasing need to optimize the synchronization process between the client and server computers. This need for an efficient and manageable synchronization process is further increased when server computers communicate with client computers over a large network such as the Internet. An inefficient database synchronization algorithm can cause unnecessary network traffic and cause other applications running on each computer to run inefficiently or even cause system failure.

SUMMARY OF THE INVENTION

In accordance with the present invention, a system and method for optimizing the data transfer between mirrored databases stored on both client and server computers are provided. More specifically, the present invention provides a system and method for efficiently synchronizing multiple databases while maintaining parent-child relationships between related database objects. The method and system allows a client computer to update a server database while minimizing the number of network connections between the client and server computers. By minimizing the number of network connections, the system and method create more efficient communication between the two computing devices. The method and system of the present invention also allows the server computer to generate object ID numbers for the database objects. This capability allows the server and client computers to generate object ID's in duplicated databases without generating conflicting ID numbers for identical objects.

According to one form of the present invention, a database format is provided that stores at least three different types of objects related to three types of information: (1) account information, (2) position information, and (3) transaction information. In this database format, the objects storing the account information are always base objects, e.g., they never have a parent object. The objects storing the position information are child objects of the objects storing the account information. The objects storing the transaction information are child objects of the objects storing the position information. The objects storing the account information contain specific information such as an account name and user identification information. The objects storing the position information store specific information related to a particular investment option such as investment type, ticker symbol and investment description. The objects storing the transaction information store specific information related to the purchase of an investment option, such as the price, quantity and purchase date. Each object also contains several data attributes that identify the relationships between each object: a local ID, a server ID, and a parent ID. Each object also contains a status code to indicate the object's upload status.

In accordance with other aspects of this invention, client and server computer databases are synchronized by selectively uploading objects from the client computer database, thereby minimizing the amount of data transferred between the client and server computers. The synchronization routine of the present invention selectively uploads objects based on the status code of the object. The status code of each object is updated by an update routine that verifies if related higher level, i.e., parent, grandparent, etc., objects have been successfully uploaded. If a parent object has been successfully uploaded, its children, grandchildren and successors are also uploaded. If any particular object is not successfully uploaded from the client computer to the server computer, lower level, i.e., children, grandchildren, of that object are all bypassed in the synchronization process and not uploaded to the server computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A–4D are representative sections of an exemplary database utilized in the method of the present invention.

DETAILED DESCRIPTION OF THE PREFERRED EMBODIMENT

The present invention provides a system and method for optimizing data synchronization between client and server computers that store common database objects. More specifically, the present invention provides a method and system for efficiently synchronizing multiple databases while maintaining parent-child relationships between related database objects. The present invention also provides a method and system that updates the objects in a server computer database while minimizing the number of network connections between the server computer and the client computer that is the source of the updating data. Preferably the method and system of the present invention generates ID numbers for the distributed database objects in such a way that multiple client computers do not generate conflicting ID numbers for identical objects.

Figure 1:
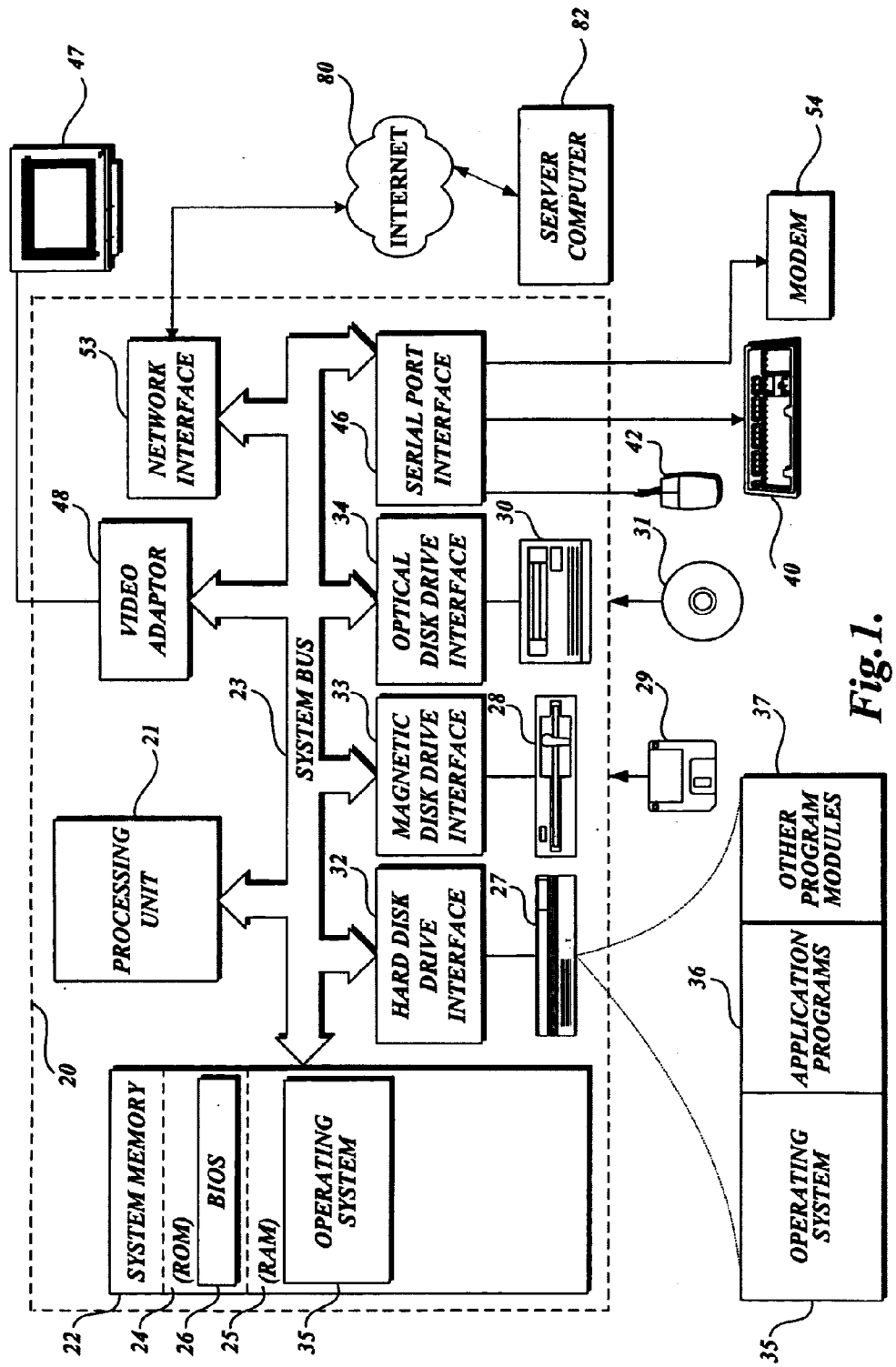
FIG. 1 is a block diagram illustrating a client computer for implementing the invention.

FIG. 1 illustrates an exemplary general purpose computing device in the form of a conventional personal computer 20, also referred to as a client computer 20, for implementing the client side of the system and method of the invention. The client computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a magnetic disk drive 28 for reading from or writing to a removable magnetic disk 29, and =an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAM), read only memories (ROM), and the like, may also be used in the exemplary operating environment.

A number of program modules may be stored on the hard disk 27, magnetic disk 29, optical disk 31, ROM 24 or RAM 25, including an operating system 35, one or more application programs 36, and other program modules 37. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, client computers typically include other peripheral output devices, such as printers.

The client computer 20 operates in a networked environment using logical connections to one or more remote computers, such as a server computer 82. Alternatively, the remote computer of which there may be several, may be another personal computer, a router, a network PC, a peer device or other common network node, and typically includes many or all of the elements described above relative to the client computer 20. The logical connections depicted in FIG. 1 is illustrated as the Internet 80. Alternatively, or in addition, the logical connection could include a local area network (LAN) and/or a wide area network (WAN). Such networking environments are commonplace in offices, enterprise-wide computer networks, Intranets and the Internet 80. As depicted in FIG. 1, the remote (server) computer 82 communicates with the client computer 20 via the Internet 80.

As shown, the client computer 20 is connected to the Internet 82 through a network interface or adapter 53. Alternatively, the client computer 20 may include a modem 54 or other means for establishing communications over a wide area network, such as the Internet. The modem 54, which may be internal or external, is connected to the system bus 23 via the serial port interface 46. In a networked environment, program modules depicted relative to the client computer 20, or portions thereof, may be stored in the remote memory storage device. It will be appreciated that the network connections shown are exemplary and other means of establishing a communications link between the computers may be used.

Figure 2:
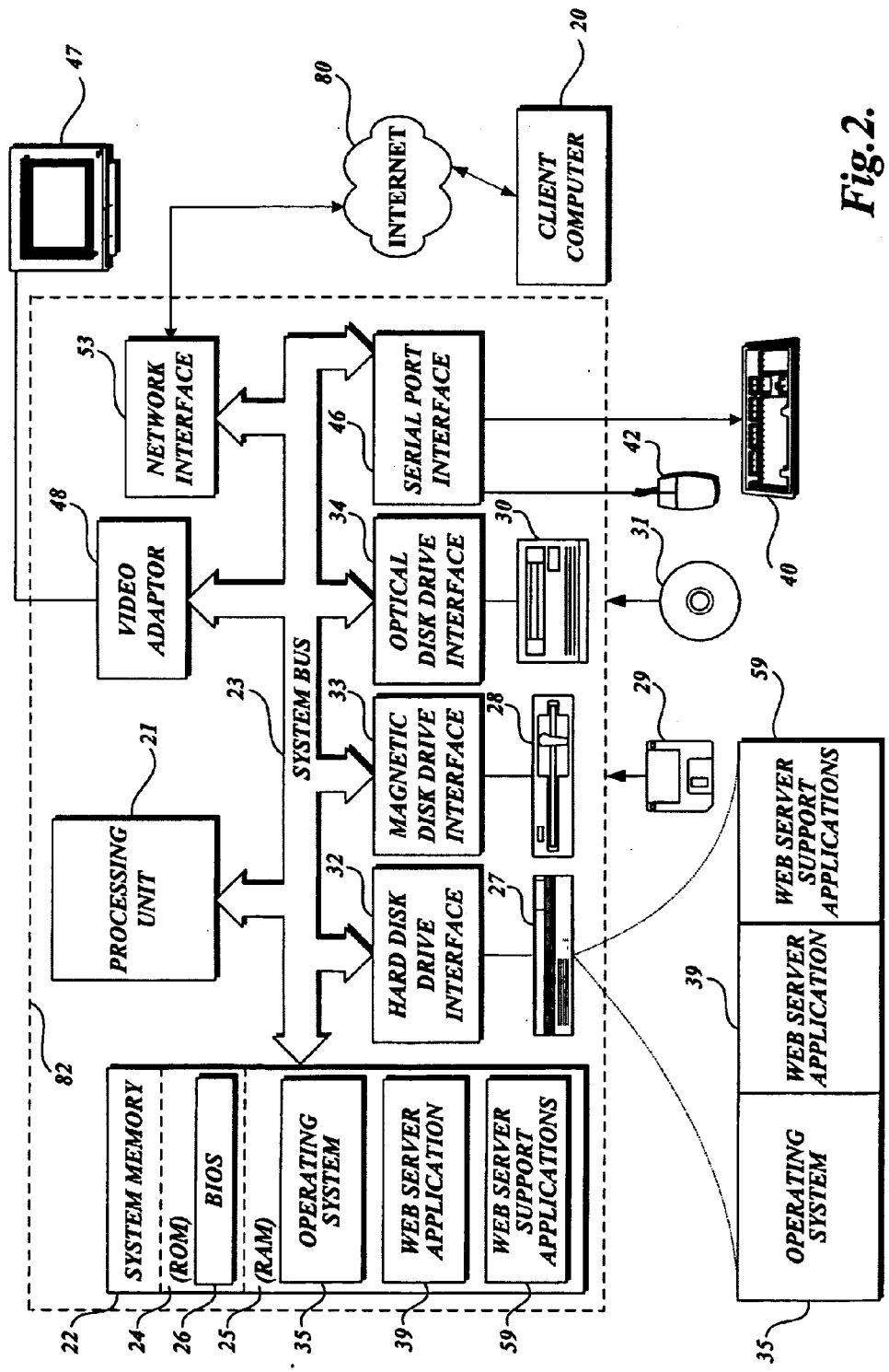
FIG. 2 is a block diagram illustrating a server computer for implementing the invention.

With reference to FIG. 2, an exemplary Web server (hereinafter "server computer") 82 for implementing the invention is shown. The server computer 82 may include many components similar to those depicted in FIG. 1, such as the processing unit 21, video adapter 48, system bus 23, hard drive 27, and other devices known in the art. Normally the server computer 82 will include a much larger hard drive 27 and more memory capacity in the random access memory (RAM) 25 when compared to the client computer 20. The hard drive 27 includes an operating system 35, a Web server application 39, and other supporting software 59 for the Web server application 39, which are also loaded into the RAM 25. Like the client computer 20 of FIG. 1, the network interface 53 of the server computer 82 is communicatively connected to a network such as the Internet 80 which allows the server computer 82 to communicate with a plurality of client computers, which may have a construction similar to the construction of the personal computer 20 depicted in FIG. 1 and described above.

Figure 3:
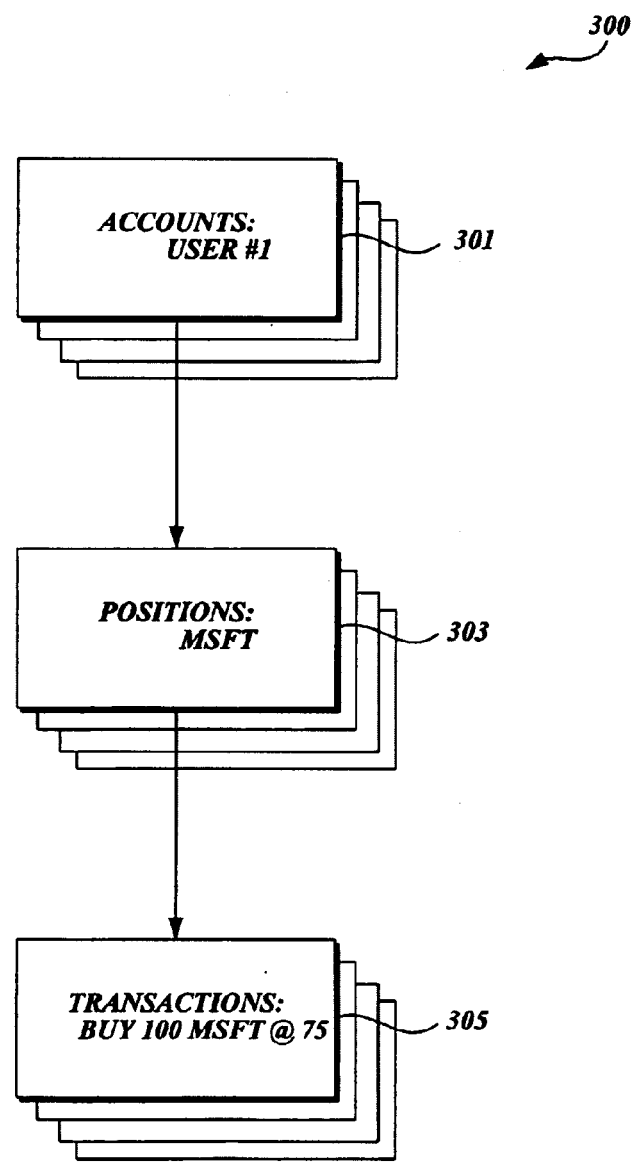
FIG. 3 is a block diagram illustrating the database format of the present invention.

FIG. 3 illustrates an exemplary data structure employed by one actual embodiment of the present invention. This data structure represents the format of the data stored on the client and server computers. The exemplary data structure is a financial data structure and includes at least three different types of objects that are categorized by the following types of information: (1) account information, (2) position information, and (3) transaction information. The account information objects include data such as a user ID, an account name, and other user related information such as the user's address or the like. The position information objects include data such as the name of a particular holding in an investment portfolio, e.g., a stock, bond or mutual fund, and the quantity and purchase price of the holding. The transaction information objects include data such as the name of a particular holding, the quantity and price of that holding, and the date of purchase. Each data structure object also contains several common data attributes: a local ID, a server ID, a parent ID and a status code.

The objects of the above-described data structure have a parent-child relationship. Specifically, the account information objects 301 are parents of the position information objects 303, and the position information objects 303 are parents of the transaction information objects 305. The account information objects 301 are considered to be "base objects," thus, an account information object 301 will never have a corresponding parent object. Although the representative example shows only three generations in the parent-child data structure, additional data object formats can be used. For example, the transaction information objects 305 may have child objects created to store data related to selected aspects of the transaction information objects.

FIGS. 4A–4D illustrate a representative section of a client computer database that is based on the data structure illustrated in FIG. 3 and described above. The representative database section shown in FIGS. 4A–4D includes three types of objects: account information objects 301, position information objects 303, and transaction information objects 305. Each object has the capacity to store related data as described above. Alternatively, each object may contain a memory pointer that refers to data associated with the object. For example, the Account A1 object 401 shown in FIGS. 4A–4D may also include a field with a memory pointer used to locate the corresponding user information stored in the computer memory.

In addition to a field containing the name of the object, such as Account A1, the objects in the database shown in FIGS. 4A–4D include ID attribute fields that contain information that is used for maintaining the relationship between selected objects. More specifically, each object in the database includes the following ID attribute fields: local ID, server ID, and parent ID. The local ID field of each object is used to identify associated child objects. The parent ID field of each object is used to identify the associated parent object. For example, the Account A1 object 401 has the value of "1" in the local ID field. Correspondingly, the Position P1 object 402 has the value of "1" in the parent ID field, thus showing that the Position P1 object 402 is a child object of the Account A1 object 401. The server ID field contains an ID provided by the server computer 82 in the manner hereinafter described, whereas the local IDs are created by the client computer 20. In addition to the object name and ID attribute fields, each object includes a status field (described below).

Figure 4A:

FIGS. 4A–4D are provided for illustration purposes so that synchronization routine will be easily understood. The synchronization routine is described in detail below with reference to the flow diagrams of FIGS. 5–8. FIG. 4A illustrates a database created by a client computer 20 that contains fourteen objects 401–415, two account information objects 401 and 411, three position information objects 402, 405 and 412, and nine transaction information objects 403, 404, 405, 408, 409, 410, 413, 414 and 415. FIG. 4B shows the database shown in FIG. 4A rearranged so that the objects are sorted by object type. FIG. 4C shows an updated version of the database shown in FIG. 4A at a time after the two account information objects 401 and 411 have been uploaded to the server computer 82. FIG. 4D shows an updated version of the database shown in FIG. 4A at a time after the three transaction information objects 402, 406, and 412 have been uploaded to the server computer 82. As mentioned above, the database shown in FIGS. 4A–4D is presented for illustration purposes only. While the database illustrations shown in FIGS. 4A–4D show that the database objects have been sorted, this is done for ease of understanding. Preferably, embodiments of the present invention will not employ an actual sorting technique. Rather, other known mechanisms for keeping track of the order of objects will be employed.

With reference to FIGS. 4A–4D, a short summary of the synchronization routine of the present invention is next described. In this illustrative example, a user of the client computer 20 has created two different investment accounts. As shown in the database of FIG. 4A, the first account, the Account A1 object 401, has two associated position information objects 402 and 406 and six associated transaction information objects 403–405 and 408–410. The second account, the Account A2 object 411, has one associated position information object 412 and three associated transaction information objects 413–415. As indicated by the status field of each object, none of the objects 401–415 have been uploaded to the server computer 82.

The synchronization routine starts by uploading the base objects from the client computer 20 to the server computer 82. FIG. 4B represents the state of the client computer database before the synchronization process attempts to upload the two base objects 401 and 411 to the server computer 82. As shown, the status field of the two base objects 401 and 411 contains the status code "to be uploaded."

FIG. 4C represents the state of the client computer database after the synchronization process has attempted to upload the two base objects 401 and 411 to the server computer 82. In this example, the Account A1 object 401 was successfully uploaded to the server computer 82. Responsive to a receiving the Account A1 object 401, the server computer 82 assigns a server ID and a new status code to the Account A1 object 401 and returns the updated object back to the client computer 20.

After the updated object, in this example the Account A1 object 401, is received by the client computer 20, the client computer 20 updates the database fields associated with the updated object. In the FIG. 4C example, the server ID and the status fields of the Account A1 object 401 have been updated to contain the number "100" and the status code "uploaded," respectively. The client computer 20 also updates the parent ID field of every child object associated with each updated object. In the example of FIG. 4C, the Position P1 object 402 and Position P2 object 406 are related to the updated Account A1 object 401, and as a result their parent ID fields have been updated with the server ID code "Server ID 100."

In the example of FIG. 4C, the Account A2 object 411 was not successfully uploaded to the server computer 82 in the upload attempt. When the server computer 82 detects a particular object upload error, the server computer 82 sends an "error" status code back to the client computer 20 and does not generate a server ID for that object. Upon receiving the "error" status code, the client computer 20 updates the status field in the client computer database by inserting the error code. Thus, as shown in FIG. 4C, the status field of the Account A2 object 411 contains the status code "error."

Whenever the client computer 20 receives an "error" status code for any updated object, the client computer 20 updates the status field of all child and grandchild objects related to the updated object to indicate that the updated object failed to upload to the server computer 82. Thus, as shown in FIG. 4C, the status field of all descendant objects of the Account A2 object 411 are updated with a status code "error." In this example, the Position P3 object 412, Transaction T7 object 413, Transaction T8 object 414, and Transaction T9 object 415 all contain an "error" status code in the status field.

After uploading the base objects, the synchronization routine then uploads the remaining objects in the client computer database. In this part of the process, the client computer 20 checks the status and parent ID field of each object to determine if a particular object can be uploaded to the server computer 82. If the status field of a particular object contains an "error" status code, the client computer 20 does not attempt to upload that particular object to the server computer 82. However, if the status field of a particular object contains a "to be uploaded" status code, and the parent ID field contains a "Server ID," the client computer 20 attempts to upload the object to the server computer 82. Thus, in the example shown in FIG. 4C, the client computer 20 would attempt to upload the Position P1 and Position P2 objects 402 and 406. The client computer 20 would bypass the Position P3 object 412 because of the "error" status code.

Referring now to FIG. 4D, the representative database shows the state of the client computer database after the Position P1 and Position P2 objects 402 and 406 have been successfully uploaded to the server computer 82. Similar to the process related to the base objects, as described above, the client computer 20 updates the server ID and status fields of the updated objects 402 and 406. In this example, the server ID field of the Position P1 object 402 is updated with "150" and the server ID field of the Position P2 object 406 is updated with "152." The status field of both updated objects 402 and 406 are changed to "uploaded" to indicate that both objects have been uploaded to the server computer 82.

The client computer 20 then updates the parent ID field of the child objects related to the Position P1 object 402 and the Position P2 object 406. As shown in FIG. 4D, the parent ID field of the related transaction information objects 403–405 are updated with the code "Server ID 150" and the other transaction information objects 408–410 updated with the code "Server ID 152." The synchronization routine then continues by uploading the remaining transaction information objects having a status code of "to be uploaded" and bypassing all of objects having a status code of "error."

As will be readily appreciated from the foregoing description, the synchronization routine effectively examines all of the objects in the client computer database and selectively uploads objects in a way that optimally synchronizes client and server computer objects.

Figure 5:
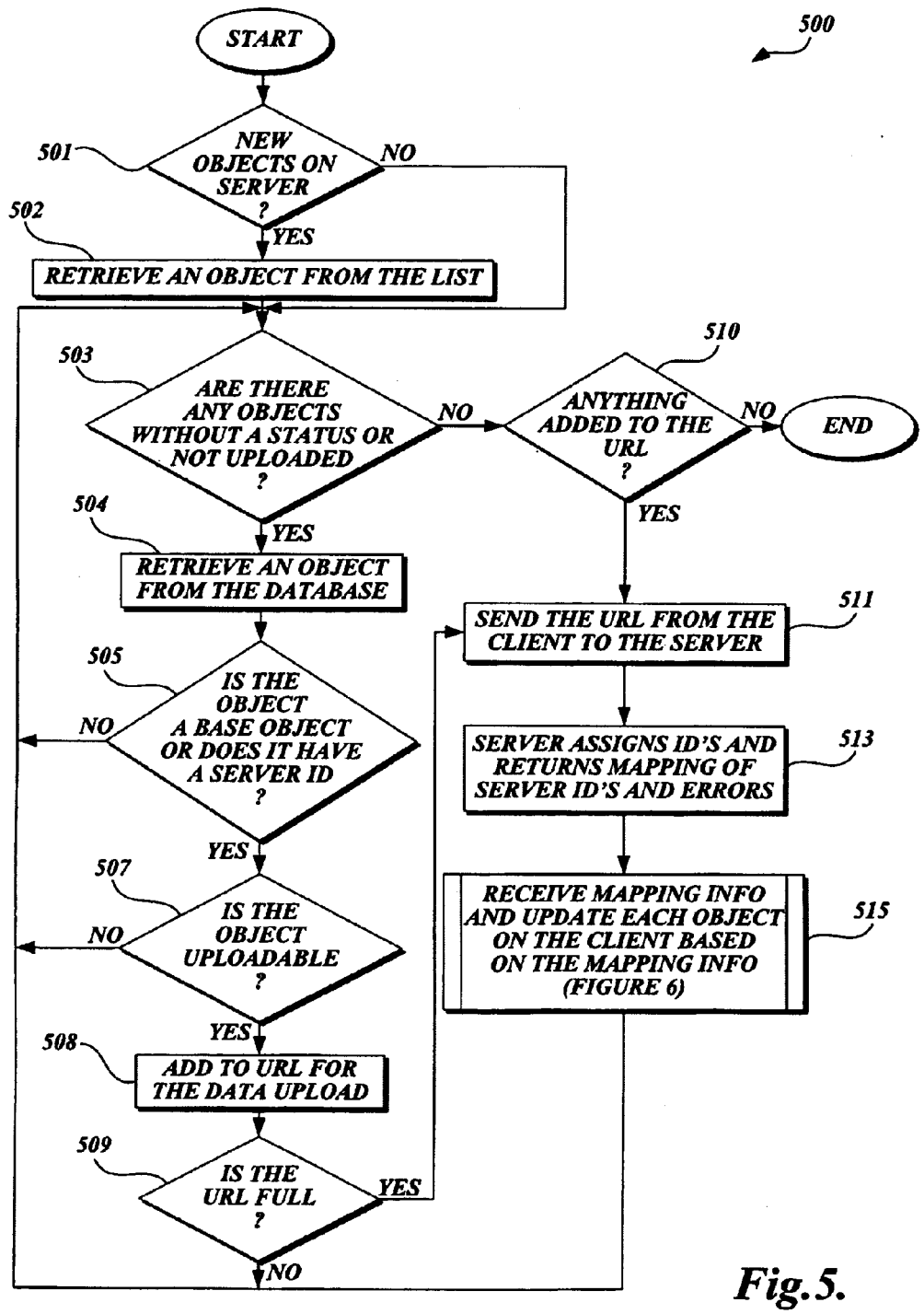
FIG. 5 is a flow diagram illustrating a data synchronization routine formed in accordance with this invention executed on a client-server computer system.

FIG. 5 illustrates a synchronization routine 500 formed in accordance with the invention that synchronizes common database objects between databases stored on client and server computers. The synchronization routine 500 illustrated in FIG. 5 and described below provides efficient data transfer between the client and server computers by minimizing the amount of data traffic and the number of network connections between the two computing devices required to transfer data.

The synchronization routine 500 starts after the client computer 20 establishes a connection with the server computer 82. First, as shown in block 501, a test is made to determine if the server computer database contains new objects that need to be transferred to the client computer 20. In this part of the routine, the server computer 82 checks for new objects that may have been created by another client computer. For example, if a user accessed the server computer 82 from a first client computer and added a stock to his portfolio, a new object would be created in the server computer database. If the same user accessed the server computer 82 from a second client computer, the server computer would (1) determine that the server and second client computer databases were not synchronized; (2) decide which objects, in this case the new object, were not contained in the second client computer database, and download the missing, i.e., the new object to the second client computer. Any one of several well known methods can be used to determine if the databases of the server and second client computer databases are synchronized, the simplest being comparing time-stamps that change each time a database is requested.

Returning to FIG. 5, at decision block 501, if the server computer 82 determines that there are new objects to download to the client computer 20, the synchronization routine 500 continues to block 502 where the server computer 82 sequentially retrieves new objects and downloads the new objects to the client computer 20. In addition to downloading the new objects, the server ID assigned to the new objects by the server computer are downloaded from the server computer 82 to the client computer 20. For example, if a Position P4 object was added to the database shown in FIG. 4D, in addition to downloading the Position P4 object, the server computer 82 would download the server ID assigned to the Position P4 object and place it in the parent ID field. In addition, the server computer 82 would cause an "uploaded" status code to be placed on the status field of each downloaded new object.

Returning to decision block 501, if there are no objects to be downloaded from the server computer 82 to the client computer 20, or after all new objects have been downloaded from the server, the synchronization routine 500 continues at block 503 where the client computer 20 determines if there are any objects in the client computer database that need to be uploaded to the server computer 82. The client computer 20 makes this determination by sequentially examining the status field of each object in the client computer database. If the client computer 20 encounters an object whose status field contains the status code "to be uploaded," or if there is no status code, the synchronization routine 500 retrieves the object from the client computer database. See block 504.

At block 504, the client computer 20 retrieves the object from the client computer database by reading selected object attributes. More specifically, the client computer 20 reads the data in the Object Name, local ID and parent ID fields. At the same time, the client computer 20 retrieves the object's data, which, depending on the nature of the object, may include account numbers, name of a stock, quantity, price, etc., in the case of a financial implementation of the invention.

The routine then continues to block 505 where the client computer 20 determines if the retrieved object is a base object or if the object has a server ID stored in the parent ID field. In this part of the process, the client computer 20 determines if an object is a base object by analyzing the Object Name field. Any object having a value in the Object Name field indicating that it is an account information object (301 of FIG. 3), is considered to be a base object. Also, in the process of block 505, the client computer 20 examines the parent ID field to determine if a server ID exists.

The process of block 505 is executed in this manner because it is more efficient to upload an object only if its parent object is uploaded first. Since base objects do not have a parent object, they can be uploaded at any time. Similarly, if an object has a server ID in the parent ID field, that particular object can be uploaded to the server computer 82 because the parent of that object has been uploaded.

Thus, this algorithm selectively filters unnecessary objects from the data to be transferred (block 511, described below).

If the client computer 20 determines that the retrieved object does not have a server ID in the parent ID field, or determines that the retrieved object is not a base object (block 525), the process cycles back to block 503 where the client computer 20 searches for the next objects in the database to upload. The routine 500 loops through the process of blocks 503–505 until all uploadable objects have been processed in the manner described below.

Returning to decision block 505, if the client computer 20 determines that the retrieved object does have a server ID in the parent ID field, or determines that the retrieved object is a base object, the process continues to block 507. In this regard, with reference to FIG. 4D, if the Account A1 object 401 is the object being examined, the routine 500 would continue to block 507 because the Account A1 object 401 is a base object. Similarly, if the Transaction T1 object 403 is examined, the routine 500 would continue to block 507 because the Transaction T1 object 403 contains a server ID in the parent ID field.

At block 507, the client computer 20 checks the status field of the retrieved object to determine if the object being examined is uploadable. More specifically, the client computer 20 checks for the status code "to be uploaded." If the status field object contains a "to be uploaded" status code, the process continues to block 508 where the object's attributes and corresponding data are added to a URL string which is used to facilitates the uploading of data to the server computer 82. Conversely, if at decision block 507, the status field of the retrieved object contains the "uploaded" or "error" status code the routine 500 cycles back to decision block 503 and process of blocks 503, 504 and 505 are repeated.

Since the use of URL strings to upload the data is old and well known, the details of such strings are not described here. The URL string can be in any format so long as the appropriate object attributes and corresponding object information is sent to the server computer 82. More specifically, each object added to the URL string by the client computer 20 should include the object's parent ID, local ID, and all of the associated object information such as account number, stock name, price, etc., as determined by the nature of the object.

After each addition, as noted by block 509, the client computer 20 determines if the URL string is full. The client computer 20 can determine if a URL is full by analyzing the length of the URL string. For example, if a URL string contains over one thousand twenty-four text characters (or any other desired limit), the URL string could be determined as a full URL string. If the client computer 20 determines that the URL is full, the synchronization routine 500 cycles to block 511 where the client computer 20 transmits the URL string to the server computer 82. Since transmission of URL strings over a TCP/IP network is known to those skilled in the art, such transmission is not described here.

If, at decision block 509, the client computer 20 determines that the URL is not full, the synchronization routine 500 cycles back to block 503 where the client computer 20 determines if there are additional objects to be uploaded. At this point, the synchronization routine 500 loops through the process of blocks 503–515 until the URL string is full or until all of the objects in the client computer database have been checked and determined to either have an "error" status code or have been uploaded to the server computer 82. The cycling ends when, at block 503, the client computer 20 determines that all of the objects in the database have an "error" status code or have been uploaded to the server computer 82 (or are in a URL string to be uploaded). When the client computer 20 makes this determination, at block 503, the routine cycles to block 510 where the client computer 20 determines if there is any data added to the URL string, i.e., if the URL string contains data that needs to be uploaded.

The client computer 20 may determine (block 510) if new data was added to the URL string by examining the length of the URL string. As known to those skilled in the art, such a determination at block 510 can be executed using a variety of methods. For example, a string matching algorithm can be used to determine if new data was added to the URL string. If, at block 510, the client computer 20 determines that the URL string does not contain any added data, the synchronization routine 500 terminates. Alternatively, if at decision block 510, the client computer 20 determines that new data has been added to the URL string, the routine cycles to block 511 where the client computer 20 transmits the URL string to the server computer 82. Object data contained in URL strings transmitted to the server computer 82 are stored in memory of the server computer 82.

Upon receipt of a URL string from the client computer 20, as shown by block 513, the server computer 82 assigns server IDs to the objects contained in the string. After the server computer 82 assigns the server IDs to the server ID fields of the received objects, as also shown by block 513, the server computer returns the updated objects to the client computer 20. The server computer 82 can assign each object any server ID number so long as the server ID numbers do not conflict with each other. In addition to assigning the server ID's, the server computer 82 assigns a status code to each received object. As explained in more detail below with reference to FIG. 7, the server computer 82 may assign a status code of "error" to an object if the server computer 82 determines that it did not properly receive an object. Conversely, the server computer 82 may assign a status code of "uploaded" if the server computer 82 determines that it did properly receive an object. The assigned status code and the server ID's are transmitted back to the client computer 20 in a data packet referred to as the mapping information. The mapping information also includes the local ID attributes of the associated objects.

The synchronization routine 500 then continues at block 515 where the client computer 20 receives and processes the mapping information. Responsive to receiving the mapping information from the server computer 82, the client computer 20 updates the objects in the client computer database based on the received mapping information. More specifically, the client computer 20 retrieves the server ID, local ID, and the updated status code from the mapping information, thereby creating one or more updated objects. The client computer 20 then stores the attributes of the updated objects in the client computer database.

The process of block 515 also includes a process where data objects related to the updated objects are updated. If the updated object has a status code of "uploaded," the parent ID field of each child object related to the updated object is updated with the server ID of the updated object. FIGS. 4C and 4D illustrate an example of this process. When the server computer 82 receives an object, such as the Position P1 object 402, the server computer 82 assigns a server ID of "150" and returns the updated Position P1 object 402 back to the client computer 20 which results as the client computer database shown in FIG. 4D. As shown FIG. 4D, the Position P1 object 402 now contains "150" in the server ID field and "uploaded" in the status field. As described above with reference to block 515, the client computer 20 also updates the parent ID fields in the child objects of the updated object. Thus, as shown in FIG. 4D, where each child object 403–405 associated with the Position P1 object 402 is updated with a value of "Server ID 150" in the parent ID field.

However, for each updated object that does not have an "uploaded" status code, the client computer 20 updates the status field of every descendant object related to the updated object with an "error" status code. For example, as shown in FIG. 4D, since the Position P3 object 412 has a status code of "error," the client computer 20 updates the status fields of the child objects 413–415 with the value "error." The update process of block 515 is also described in more detail below with reference to FIG. 6.

From block 515, the synchronization routine 500 cycles back to block 503 where the client computer 20 determines if there are more objects to upload to the server computer 82. As mentioned above, from block 503, the synchronization routine 500 loops through the process of blocks 503–515 until all of the objects in the client computer database have been uploaded to the server computer 82, or until all of the objects have an "error" status code. The synchronization routine 500 terminates when the client computer 20 determines, at decision block 510, that no object data has been added to the URL string.

Figure 6:
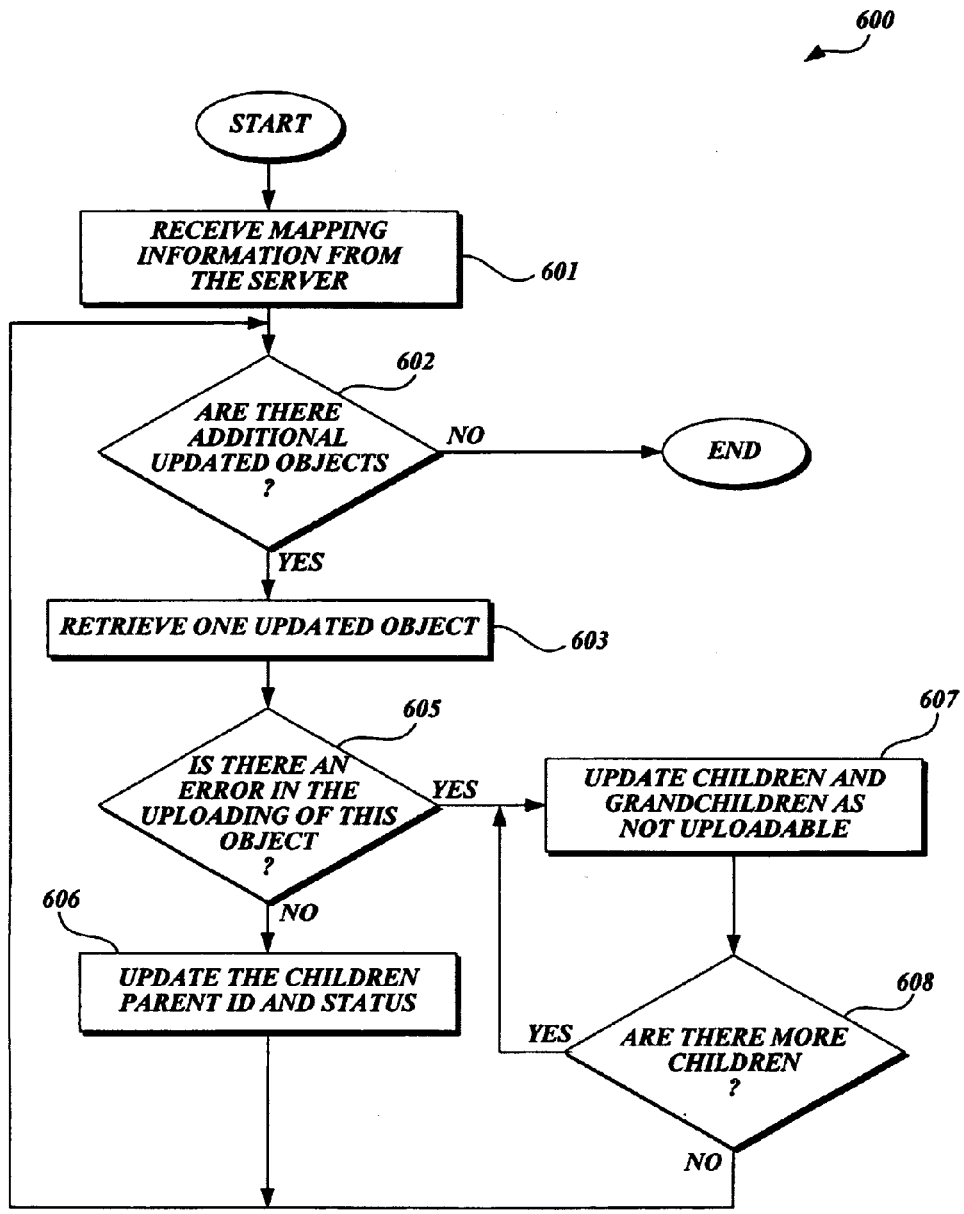
FIG. 6 is a flow diagram illustrating an update routine suitable for use in the data synchronization routine shown in FIG. 5.

FIG. 6 illustrates the update routine 600 of block 515 of FIG. 5. As noted above, the update routine 600 is carried out by the client computer 20 and updates the client computer database based on the object mapping information received from the server computer 82. As described above with reference to FIGS. 4A–4D and 5, the client computer 20 only selects objects for an upload if its parent object is uploaded to the server computer 82. The update routine 600 facilitates the synchronization routine 500 by selectively updating the child and grandchild objects in the client computer database so that the synchronization routine 500 can optimally select the objects to be uploaded and thereby provide efficient database synchronization.

The update routine 600 starts at block 601 where the client computer 20 receives the mapping information from the server computer 82. The mapping information includes information regarding one or more updated objects. The updated object mapping information contains the following attributes: a server ID, a local ID, and a status code for each updated object. As described above, the server ID is assigned by the server computer 82 and the server ID is located in the server ID field of each object.

Responsive to receiving the mapping information, the update routine 600 continues at block 602 where the client computer 20 determines the mapping information contains any updated object information. In essence, the client computer 20 scans for new object mapping information. If no such information exists, the update routine 600 terminates.

However, if at decision block 602, the client computer 20 determines that the mapping information contains information about at least one updated object, the update routine 600 cycles to block 603 where the client computer 20 retrieves one updated object from the mapping information, i.e., retrieves update information regarding a first object. The client computer 20 then saves the data attributes from the updated object to the client computer database. That is, the fields of the client computer database associated with the retrieved updated object are updated in the manner described above.

The update routine 600 then moves from block 603 to block 605 where the client computer 20 determines if there was an error in the upload process. This determination is accomplished by the client computer 20 analyzing the code in the status field of the updated object. As shown in the status fields of the objects depicted in FIGS. 4A–4D, the status of the object can be: "uploadable," "to be uploaded," "error," or "empty." (Additional, less or other designations can be used depending on a specific implementation of this invention.)

If the client computer 20 determines at decision block 605 that the status of the updated object is "error," the update routine 600 cycles to block 607 where the client computer 20 updates the status of the children and grandchildren objects of the updated object by placing an error code in the status field of the children and grandchildren objects. In this part of the routine, the process loops through to blocks 607 and 608 until the status field of all of the related children and grandchildren objects contain an "error" code. After the status fields of all objects related to the updated object have been updated, the update routine 600 cycles back to block 602 where the client computer 20 determines if the mapping information contains update information about any other updated objects.

Updating the status fields of all of the descendant objects to "error" allows the client computer 20 to easily pass over these objects when making upload determinations during the synchronization routine 500 described above. If the upload process of a parent object fails, the status fields of the parent object, its children, its children's children are set to a value (error) indicating that those objects are not to be sent to the server computer 82. This process reduces the amount of unnecessary data to be transferred over the network.

FIG. 4C illustrates an example of several database objects that are modified by the update routine 600. The Account A2 object 411 is shown as having an error status. This occurred because the client computer 20 using the mapping information determined that the Account A2 object 411 was an updated object having an "error" code in its status field. As a result, the client computer 20 updated the status field of the Position P3 412, Transactions T7 413, Transactions T8 414, and the Transactions T9 object 415 so that each contains an error status code since these objects are children and grandchildren of the Account A2 object.

Referring again to block 605 of FIG. 6, if the client computer 20 determines that the status field of the updated object does not contain an "error" code, the update routine 600 cycles to block 606 where the client computer 20 updates the status field and server ID field of the children objects of the updated objects. For example, as shown in FIG. 4C, because the Account A1 object 401 is found to have a status of "uploaded," the client computer 20 updates the parent ID and status field of the Position P1 object 402, with the codes of server ID 100 and "to be uploaded," respectively. This allows the client computer 20 to upload the child objects associated with the Account A1 object to the server computer 82 when they are selected for determination during upload in the synchronization routine 500.

The update routine 600 then cycles back to block 602 where the client computer 20 determines if there are any more updated objects in the mapping information. As described above, the update routine 600 loops through blocks 602–608 until all of the updated objects have been retrieved and analyzed. When the client computer 20 determines, at block 602, that the mapping information contains nothing further regarding updated objects, the update routine 600 terminates.

Figure 7:
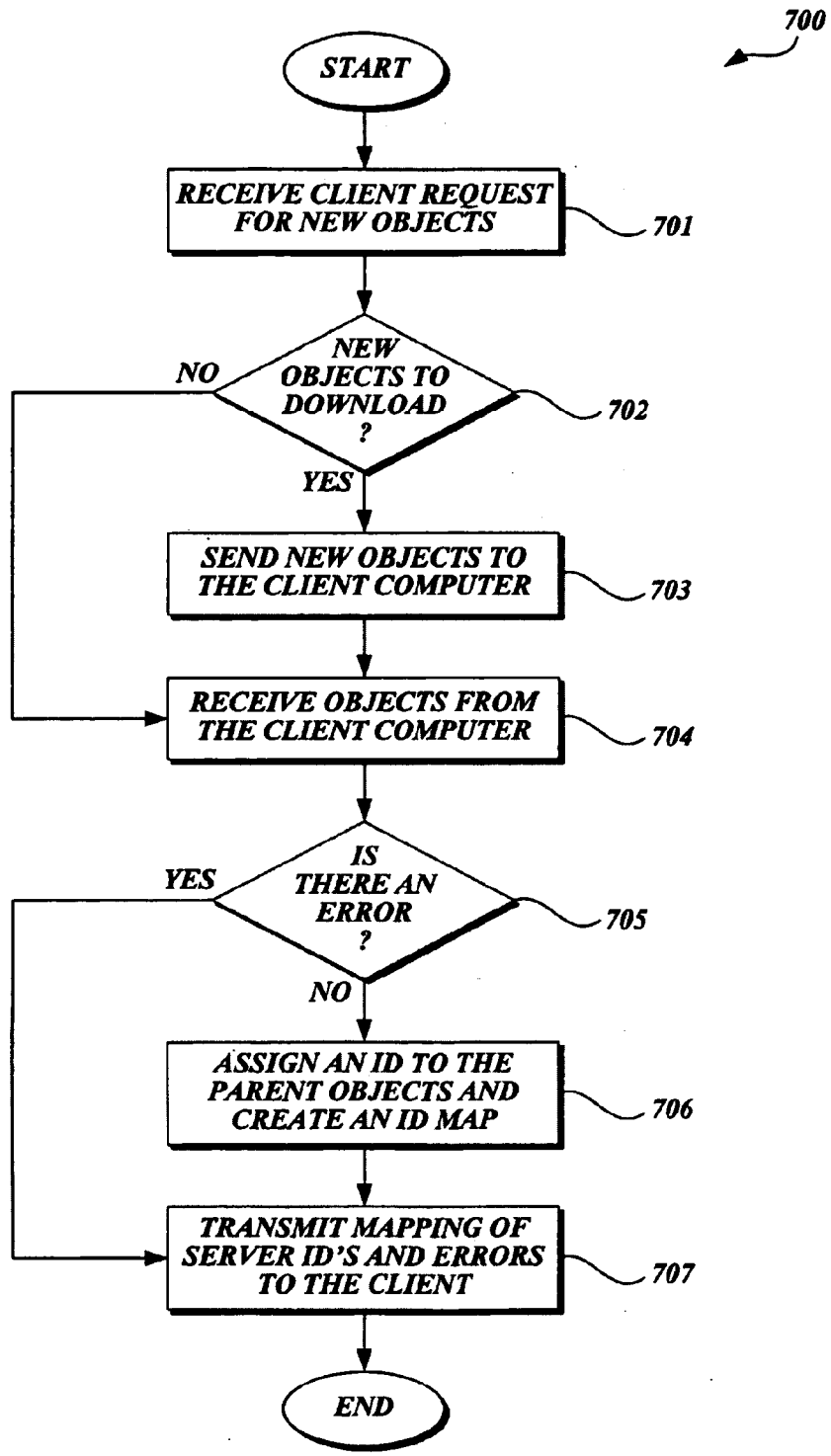
FIG. 7 is a flow diagram illustrating a data synchronization routine formed in accordance with this invention executed by a server computer.

FIG. 7 is a flow diagram of the server executed side of the synchronization routine 500 of FIG. 5. The server executed side of the synchronization routine 700 begins at block 701 where the server computer 82 receives a request from the client computer 20 to receive the new server database objects. As described above with reference to block 501 in FIG. 5, the client computer 20 sends a request to the server to determine if the server computer 82 has new objects in the server database. Responsive to the request for new objects, the routine 700 cycles to block 702 where the server computer 82 determines if there are new objects in the server database. As described above with reference to block 501 of FIG. 5, the server database may contain a new object created by another client computer. Alternatively, the server database may contain a new object created by an application running on the server computer 82.

At block 702, if the server computer 82 determines that the server database contains at least one new object, the routine cycles to block 703 where the server computer 82 transmits the new objects to the client computer 20. As described above with reference to block 502 of FIG. 5, the new objects transmitted by the server computer 82 to the client computer 20 each include a server ID assigned by the server computer 82. As discussed above, each new object downloaded to the client computer 20 also includes a status code indicating that the object has been uploaded. The routine 700 then continues to block 704 where the server computer 82 receives objects from the client computer 20. The server executed synchronization routine 700 also continues to block 704 if the server computer 82 determines at block 702 that there are no new objects in the server database.

At block 704, the server computer 82 receives one or more objects from the client computer 20. As described above with respect to block 511 of FIG. 5, the server computer 82 receives new objects from the client computer 20, if new objects exist in the client computer database. Also as described above, this transmission is facilitated by a URL string sent from the client computer 20. When practicing the process of block 704, the server computer 82 may parse the URL to locate the individual objects contained in the URL string. As noted above, each object contains object attributes such as the local ID, the server ID, parent ID, the object status code and the data associated with the object.

After the new client objects are received (block 704), the routine 700 cycles to block 705 where the server computer 82 determines if there are errors in the object's data transfer. The server computer 82 may determine that there was an error in the data transfer if the server computer 82 finds a duplicate record, such as two base objects having the same server ID number. The server computer 82 may also determine that there was a data transfer error if the date of a record is invalid, or if the server computer 82 determines that certain object account information is invalid, such as a user password.

At decision block 705, if the server computer 82 does not detect a data transfer error, the routine cycles to block 706 where the server computer 82 assigns a server ID to the parent object fields of each object and creates an ID map. As mentioned above, the ID map also referred to having mapping information, contains the ID's and status code information for each object updated by the server computer 82. The server IDs assigned to the objects may be any integer or address value so long as the server ID is unique for each object. For example, with reference to FIG. 4D, the Position P1 object 402 must have a different server ID than the Position P2 object 406. Also mentioned above, one benefit of the present invention is having the server computer 82 assign the server IDs. This prevents the system from creating conflicting IDs which could occur if client computers as well as the server computer were allowed to assign server IDs. A single source of assignment is important in duplicate database systems, i.e., systems where the same data is stored and maintained on more than two different computing devices. In block 706, the server computer 82 also updates the status code of each object as "uploaded" and stores the new status code and server ID in the mapping information. After the mapping information has been updated for each object, the routine 700 cycles to block 707 where the server computer 82 transmits the mapping information to the client computer 20.

The routine 700 may also cycle to block 707 from block 705, if at decision block 705, the server computer 82 determines that a data transfer error occurred with respect to a particular object. At decision block 705, if the server computer 82 determines that data transfer has occurred with respect to a particular object, the server computer 82 assigns an "error" status code of the object associated with the error and adds the new status code for the object to the mapping information.

As noted above, at block 707, the updated object mapping information is transmitted to the client computer 20. The process of block 707 is carried out in the manner described above with reference to block 515 of FIG. 5. Generally described, the server computer 82 transmits the server ID, local ID, and the updated status code contained in the mapping information to the client computer 20. After the server transmits the mapping information to the client computer 20, the server executed synchronization process 700 terminates.

Figure 8:
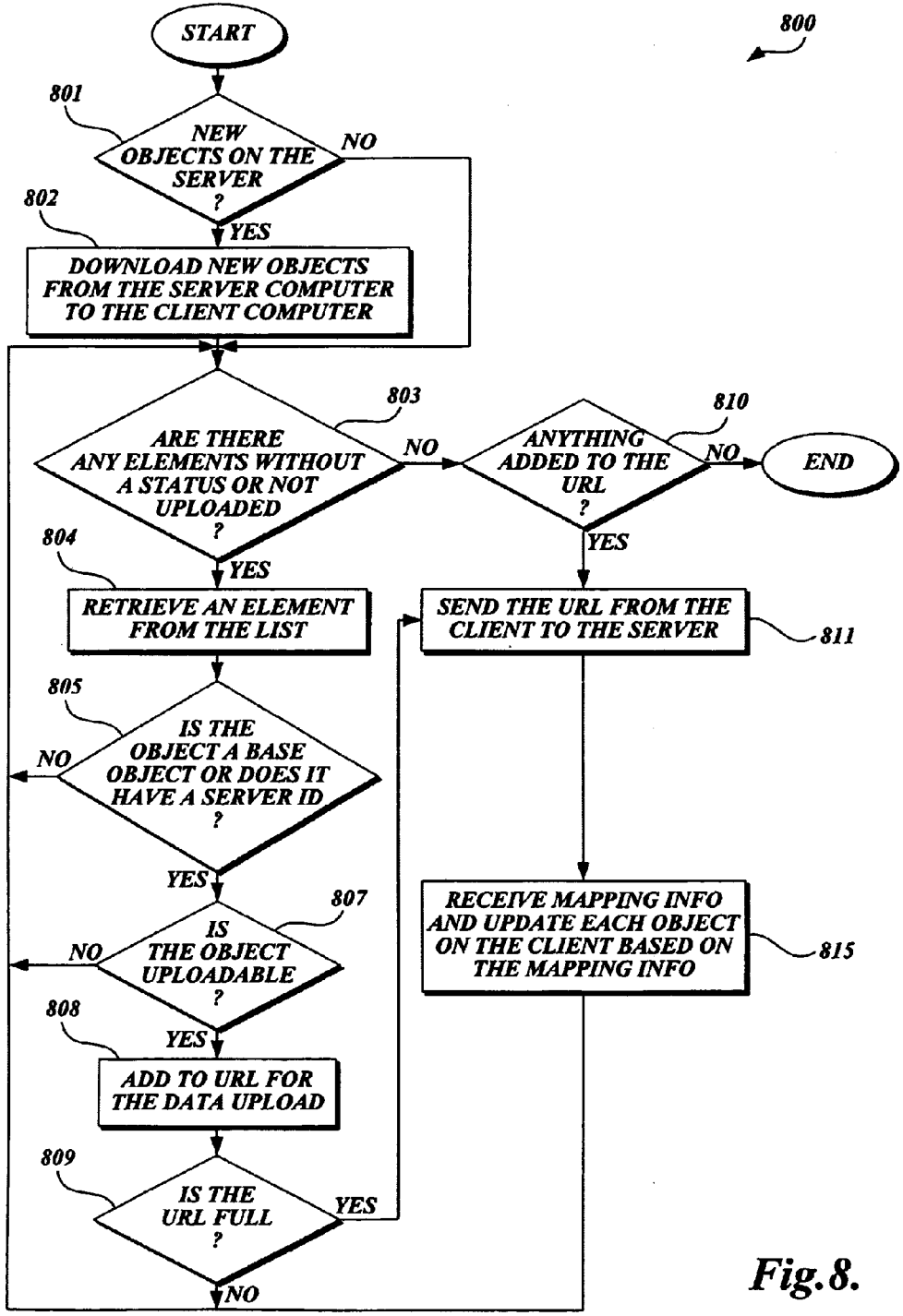
FIG. 8 is a flow diagram illustrating a data synchronization routine formed in accordance with this invention executed by a client computer.

FIG. 8 is a flow diagram illustrating the synchronization routine 500 of FIG. 5 as the routine is executed by a client computer 20. The client executed synchronization routine 800 is executed in the same manner as the synchronization routine 500 of FIG. 5, except for the omission of block 513 where the server processes are described. Because blocks 801–811 and 815 of FIG. 8 correspond to blocks 501–511 and 515 of FIG. 5 and because the operation of blocks 801–811 and 815 of FIG. 8 correspond to the operation of blocks 501–511 and 515 of FIG. 5, the operation of blocks 801–811 and 815 is not described further.

While the presently preferred embodiment of the invention has been illustrated and described, it will be appreciated that various changes can be made therein without departing from the spirit and scope of the invention. As will be readily understood by those skilled in the art of computer databases, the database tables illustrated in FIGS. 4A–4D are exemplary, and alternative configurations may be used in accordance with the invention. For example, each object may also include other fields containing additional status information if desired.

What is claimed is:

1. A computer-implemented method of optimizing the synchronization of data between a client computer having a client database and a server computer having a server database, wherein each database comprises a plurality of database items that maintain a parent-child hierarchical tree relationship comprising at least one parent database item and at least one associated child database item, comprising:
   receiving at the server computer a parent database item transferred from the client computer that maintains a parent-child hierarchical tree relationship with child database items in the client database;
   assigning a status code to the parent database item received at the server computer, the status code being based upon the detection or non-detection of a data transfer error that is characteristic of an error condition;
   transmitting the status code assigned to the parent database item to the client computer, wherein the status code is assigned to the parent database item stored in the client database;
   updating a status code of the child database items associated with the parent database item in the client database, the updated status code of child database items being based on the status code of the parent database item;
   selectively communicating child database items associated with the parent database item from the client computer to the server computer, wherein child database items associated with the parent database item are communicated if the status code indicates a non-detection of a data transfer error that is characteristic of an error condition associated with the parent database item;
   synchronizing the communicated child database item with a corresponding child database item stored on the server computer;
   assigning a server ID to the database item received at the server computer if no transfer error was detected that is characteristic of an error condition; and
   transmitting the server ID assigned to the database item to the client computer.

2. The method of claim 1, wherein the status code is assigned by the server computer.

3. The method of claim 1, wherein the status code and the server ID are assigned by the server computer.

4. The method of claim 1, further comprising updating a server ID of child database items associated with the parent database item, the updated server ID of the child database items being based on the server ID of the parent database item; and wherein the selective transmission of child database items associated with the parent database item to the server computer is also based on the server ID of the child database item.

5. The method of claim 1, further comprising transmitting at least one new database item to the client computer, a server ID being assigned to said at least one new database item.

6. The method of claim 5, wherein the new database items include a server ID assigned by the server computer.

7. The method of claim 1, wherein the hierarchy further comprises at least one grandchild database item associated with the at least one child database item and the at least one parent database item, the method further comprising:
   assigning a child status code to child database items associated with the parent database item received at the server computer, the child status code being based upon the detection or non-detection of a data transfer error that is characteristic of an error condition associated with the child database item;
   updating a status code of grandchild database items associated with a child database item and associated with the parent database item, the updated status code of the grandchild database item associated with a child database item associated with the parent database item being based on the child status codes;
   selectively communicating grandchild database items associated with a child database item associated with the parent database item from the client computer to the server computer, wherein grandchild database items associated with a child database item associated with the parent database item are communicated if the status code of the grandchild database item indicate a non-detection of a data transfer error that is characteristic of an error condition associated with the child database item; and synchronizing the communicated grandchild database item with a corresponding grandchild database item stored on the server computer.

8. The method of claim 7, wherein the status codes of child database items are assigned by the server computer.

9. A computer-readable medium containing computer-readable instructions which, when executed by a computer, perform the method of claim 1.

10. A computer-controlled apparatus for performing the method of claim 1.

11. A computer-implemented method of optimizing the synchronization of data stored in a client computer database with data stored in a server computer database, wherein each database comprises a plurality of database items arranged in a parent-child hierarchical tree relationship comprising at least one parent database item and at least one associated child database item, comprising:

transmitting a parent database item that maintains a parent-child hierarchical tree relationship with child database items in the client database from a client computer to a server computer;

receiving at the client computer mapping information for the parent database item generated by the server computer, the mapping information being based upon the detection or non-detection of a data transfer error that is characteristic of an error condition associated with the parent database item;

updating a status code of child database items associated with the parent database item, the updated status code of child database items being based on the mapping information; and selectively transmitting child database items from the client computer to the server computer, wherein child database items associated with the parent database item are communicated if the mapping information indicates a non-detection of a data transfer error that is characteristic of an error condition associated with the parent database item; and synchronizing the communicated child database item with a corresponding child database item stored on the server computer;

wherein the mapping information also includes a server ID;

updating a server ID of child database items associated with the parent database item, the updated server ID being based on the mapping information; and wherein the selective transmission of child database items from the client computer to the server computer is also based on the server ID of the child database items.

12. The method of claim 11, further comprising receiving at least one new database item from the server computer, a server ID being assigned to each of said at least one new database item.

13. A computer-readable medium containing computer-readable instructions which, when executed by a computer, perform the method of claim 11.

14. A computer-controlled apparatus for performing the method of claim 11.

* * * * *